United States Patent [19]
Jager

[11] 4,149,067
[45] Apr. 10, 1979

[54] AQUARIUM HEATER

[75] Inventor: Wolfgang Jager, 153 AufDemBerg, Wustenrot-Finsterrot, Fed. Rep. of Germany, 7156

[73] Assignees: Erhard Boettger; Wolfgang Jager, both of El Segundo, Calif.

[21] Appl. No.: 741,937

[22] Filed: Nov. 15, 1976

[51] Int. Cl.² .............................................. H05B 5/54
[52] U.S. Cl. .................................. 219/523; 219/331; 219/552; 338/236; 338/240; 338/270
[58] Field of Search ............... 219/331, 523, 552, 553; 338/229, 234, 236, 237, 238, 240, 270, 274, 302; 248/206, 363; 240/52.2

[56] References Cited

U.S. PATENT DOCUMENTS

| | | | |
|---|---|---|---|
| 2,511,902 | 6/1950 | Cabrera | 219/523 |
| 2,811,629 | 10/1957 | Danner | 219/523 |
| 2,864,929 | 12/1958 | Schwing | 219/523 |
| 2,875,309 | 2/1959 | Pearce | 338/302 |
| 3,051,922 | 8/1962 | Julie | 338/234 X |
| 3,107,290 | 10/1963 | Willinger | 219/523 X |
| 3,371,192 | 2/1968 | Rosenel | 219/523 |
| 3,440,109 | 4/1969 | Plattner | 219/523 X |
| 3,754,118 | 8/1973 | Booker | 219/523 |
| 3,812,580 | 5/1974 | Drugmond | 338/240 X |
| 3,882,297 | 5/1975 | Avalon | 338/302 |
| 3,895,217 | 7/1975 | Hall et al. | 219/523 X |

FOREIGN PATENT DOCUMENTS

| | | | |
|---|---|---|---|
| 800177 | 10/1950 | Fed. Rep. of Germany | 219/523 |
| 894932 | 10/1953 | Fed. Rep. of Germany | 219/523 |
| 2334170 | 1/1975 | Fed. Rep. of Germany | 219/523 |
| 672085 | 9/1929 | France | 219/523 |

Primary Examiner—J. V. Truhe
Assistant Examiner—M. Paschall
Attorney, Agent, or Firm—Charles H. Schwartz

[57] ABSTRACT

An aquarium heater including an elongated heater element including an insulating member and a wire heater extending from one end of the insulating member to the other end of the insulating member and with an outer sheath of insulating material having open and closed ends for enclosing the heater element at the closed end and having an inner dimension larger than the outer dimension of the heater element and with a pair of spacer members disposed individually at each end of the insulating member of the heater element for spacing the heater element from the inner surface of the outer sheath and with the spacer members including means for retaining the ends of the wire heater in fixed positions at each end of the insulating member and with a resilient sealing element disposed from the open end of the sheath to seal the heater element in the closed end of the sheath and with the sealing element including grooves for passing electrical wires for supplying electrical energy to the wire heater.

11 Claims, 5 Drawing Figures

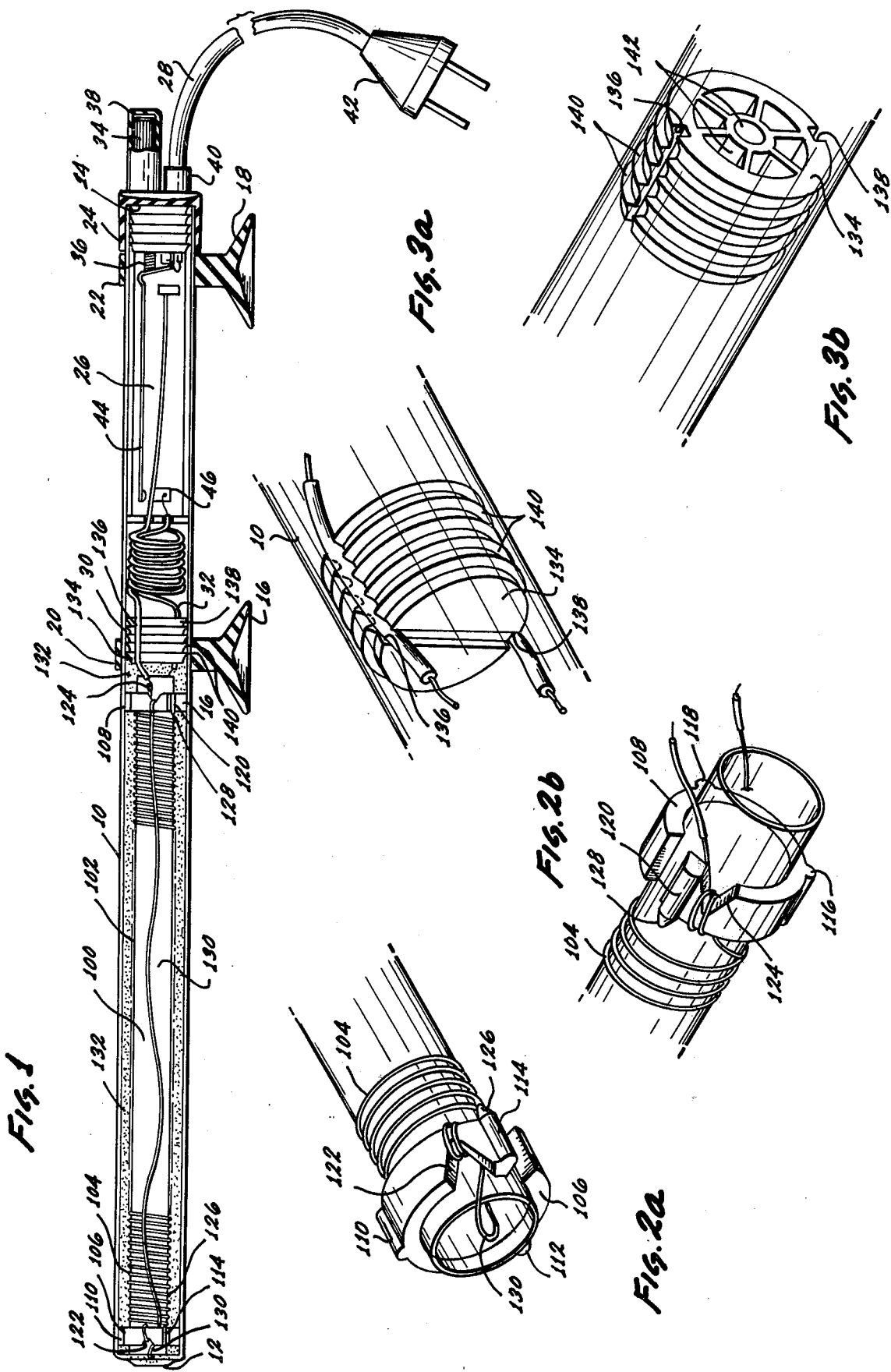

AQUARIUM HEATER

The present invention is directed to an improved aquarium heater of the type using a coiled wire as a heating element. This type of aquarium heater normally has a wire wrapped as a helix on the surface of either an insulating tube or rod. The wire is fastened at both ends of the insulating member usually by an adhesive such as glue and the two ends of the wire are brought back to be adjacent each other at one end of the insulating member.

The heating element is then placed within an outer sheath such as a glass tube and positioned at one end of the sheath and spaced from the inner surface of the outer sheath. Normally, the heating element is surrounded by a fine sand and the sand is used to space the heating element equidistant from the inner surface of the sheath. The sand acts to absorb the heat provided by the heating element and provide for a more uniform distribution of the heat to the water in the aquarium.

The heating element may be coupled to a source of electrical power through a thermostat which may also be positioned within the sheath. The aquarium heater may include means to seal the end of the sheath so that the aquarium heater is waterproof. In order to seal the heating unit at the end of the tube and to maintain the sand in position surrounding the heating element, normally a sealing material such as plastic material or an epoxy is poured into the sheath between the heating element and the thermostat to seal and lock the heating element in place.

The aquarium heater described above has enjoyed considerable success in the marketplace but there are a number of difficulties in the manufacture of this type of aquarium heater. The present invention is directed to an improved construction of an aquarium heater using a helical wire as a heating element which allows for a simpler manufacture of the heater and also provides for advantages in the operation of the aquarium heater.

During the manufacture of the prior art aquarium heaters it is difficult to maintain the heating element within the outer sheath to be equidistant from the inner surface of the sheath as the sand is being poured into the open end of the sheath. Also, it is difficult to attach the ends of the helically wound heating wire to the insulator since the helix tends to unwind and it is difficult to hold the ends of the wire to the insulator with an adhesive. The present invention provides for a spacer element having a retaining means for holding the ends of the wire and for locking the ends of the wire at the ends of the insulator in a more secure fashion than the use of adhesive. Moreover, the spacer includes protrusions which accurately space the heating element to be equidistant from the inner surface of the sheath. These spacers are formed as split rings each having at least three protrusions and including a notched portion adjacent the split in the ring for receiving the end of the wire.

These split rings, therefore, facilitate the holding of the ends of the wire during assembly of the heating element itself and then serve a second function of spacing the heating element within the outer sheath. The use of the wire-holding spacer of the present invention, therefore, provides for improvement in the manufacture of the aquarium heaters while, at the same time, ensuring a uniform distribution of heat from the aquarium heater during the life of the heater. The heating element cannot shift within the sheath even if the insulating sand shifts in position since the spacers always maintain the heating element in the proper position.

The present invention also contemplates the use of a resilient sealing element for sealing the heater element at the end of the sheath and guiding the electrical wires from the open end of the sheath to the heating element itself. This flexible sealing member includes a pair of longitudinal grooves for guiding the electrical wires and a plurality of circumferential fins for locking the sealing member in position. The fins are normally angularly disposed in one direction so as to facilitate the insertion of the sealing element but to also prevent the removal of the sealing element once it is inserted. The use of the sealing element also facilitates the manufacture of the aquarium heater of the present invention since it is no longer necessary to pour in a sealing compound which is a slower and more time-consuming operation. Also, the use of the sealing element provides for a better operation of the aquarium heater since the sealing compounds of the prior art could crack or break during use allowing for the escape of the insulating sand which, in turn, would allow the heater element to move within the sheath and reduce the uniform heating characteristics of the aquarium heater.

A clearer understanding of the present invention will be had with reference to the following description and drawings wherein FIG. 1 illustrates an aquarium heater constructed in accordance with the teachings of the present invention;

FIG. 2(a) is a perspective view of one end of the heating element included in the aquarium heater of the present invention and showing the wire-holding spacer;

FIG. 2(b) is a perspective view of the other end of the heating element included in the aquarium heater of the present invention, also illustrating the wire-holding spacer;

FIG. 3(a) illustrates the sealing element located within the outer sheath from a first perspective view; and FIG. 3(b) illustrates the sealing element within the outer sheath from a second perspective view.

In FIG. 1, an outer sheath 10 has a closed end 12 and an open end 14. The outer sheath 10 may be constructed of glass tubing and is normally opaque so that the internal construction of the aquarium heater is not visible. For purpose of description, the outer sheath is shown to be transparent so that the internal construction of the aquarium heater of the present invention is clearly shown.

A pair of suction cups 16 and 18 are held in position by integral bands 20 and 22 in order to facilitate the attachment of the aquarium heater to an inner wall of the aquarium. A flexible cap 24 seals the open end 14 of the aquarium heater and disposed within the flexible cap 24 for positioning within the open end of the sheath 10 is a thermostat unit 26. The thermostat unit provides for controlled electrical energy to be supplied to the aquarium heater from a power cord. The controlled electrical energy is supplied to a pair of insulated wires 30 and 32. A knob 34 may control an adjustment screw 36 which controls the degree of heat provided by the aquarium heater of the present invention. In order to ensure that the aquarium heater is fully watertight, the knob 34 is covered with a flexible sheath 38 which is integral with the cap 24. In addition, the electrical wire 28 passes through the sealing member 40 which is also integral with the cap 24. The wire 28 may include a standard electrical plug for providing the source of power to the aquarium heater of the present invention.

The thermostat 26 may be of any common type and, for example, may include a bimetallic element 44 which is part of the electrical circuit providing electrical power to the wires 30 and 32. The passage of current heats up the bimetallic element 44, and the bimetallic element ultimately pulls away to open a switch 46 to discontinue the application of power to the wires 30 and 32. The bimetallic element now cools down to close the switch 46, and the electrical power is once again supplied to the wires 30 and 32. It is to be appreciated that the surrounding temperature of the water in the aquarium will affect the action of the bimetallic element so as to provide for an ultimate equilibrium of temperature of the water in the aquarium in accordance with the setting of the bimetallic element. As indicated above, the setting is controlled by the threaded member 36.

The aquarium heater of the present invention includes a heating element 100 extending from the closed end 12 to the open end 14 of the sheath 10 and with the heating element 100 extending approximately ⅔ of the length of the sheath 10. The heating element includes a tube member 102 constructed of an insulating material such as glass. It is to be appreciated that the heating element may also be a rod, but the use of a tube does provide certain advantages. A helix 104 of resistance heating wire extends substantially the entire length of the insulating member 102. A pair of wire receiving spacers 106 and 108 are positioned at each end of the insulating member 102.

The spacers 106 and 108 are substantially identical and each is formed as a split ring having at least three outwardly extending protrusions which serve to space the heater element 100 equidistant within the sheath 10. As shown in FIG. 1 and, in addition, in FIG. 2(a) the split ring spacer 106 includes the protrusions 110, 112, and 114. As shown in FIG. 1 and also FIG. 2(b), the split ring spacer 108 includes protrusions 116, 118, and 120. Each split ring spacer 106 and 108 also includes a notch or V-groove portion 122 and 124. The V-groove is in the longitudinal direction of the split ring and is used to receive the end of the helix 104 for locking the end of the helix in position at the end of the insulating member 102 and thereby maintain the helix in position around the tube 102 to prevent the helix from becoming unwound and to prevent adjacent coils of the helix from touching each other.

The protrusions 114 and 120 serve an additional function other than spacing the heater element within the sheath 10. The protuberances 114 and 120 also prevent the ends of the helix wire wrapped in the V-grooves 122 and 124 from slipping off the ends of the split rings 106 and 108. For example, the protuberances 114 and 120 may include tip portions 126 and 128 to further hinder the slipping of the wire once the wire has been wrapped around the split ring in the V-grooves.

During the manufacture of the heating element 100, the wire is normally wound on the insulating tube 102 to form the helix 104. The split rings 106 and 108 are disposed at opposite ends and the ends of the helix 104 are brought through the split in each split ring and underneath each split ring and around each split ring two or three times in the V-grooves. This locks the ends of the helix 104 in position. One end of the helix 104 such as end 130 is then brought through the insulating tube 102 so that both ends of the helix come out the same end of the insulating tube 102. The ends of the helix are then attached to the insulated wires 30 and 32 as shown in FIG. 1.

During the manufacture of the aquarium heater, the heating element 100 is slipped into the open end 14 of the sheath 10 and positioned adjacent the closed end 12. The split ring spacers 106 and 108 because of the dimensions of the integral protuberances 110 through 120 position the heating element 100 at a central position equidistant from the inner surface of the sheath 10. It is to be appreciated that although the split rings 106 and 108 are shown to be identical, it could be possible to use different designs for each end of the split ring so as to facilitate the manufacture of the device. For example, the split ring 106 may have a slightly different configuration to space the heater 110 from the closed end 12.

After the heater 110 is in position at the closed end of sheath 10, fine sand 132 is poured into the sheath 10 through the open end 14 to completely surround and fill all of the space between the heating element and the sheath and fill the inside of the insulating member 102 if it is a tube member. The split ring spacers 106 and 108 allow for the passage of the sand since only in the areas of the protuberances does the split ring substantially approach the inner surface of the sheath 10. The sand is poured to the level as shown in FIG. 1 at which time the end of the heating element 100 closest to the open end 14 of the sheath 10 is sealed with a sealing element 134.

The sealing element 134 is shown in perspective views in FIG. 3(a) and FIG. 3(b). The sealing element 134 includes a pair of longitudinal grooves 136 and 138. These grooves receive the insulated wires 30 and 32 and during manufacture of the aquarium heater, the wires 30 and 32 are normally positioned in the grooves at the end of the wires adjacent the thermostat 26. The sealing element 134 is then inserted in the open end 14 of the sheath 10 and then pushed through the sheath as the wires 30 and 32 slide in the grooves 136 and 138. The sealing element 134 is ultimately pushed within the sheath 10 until it engages the level of the sand 132 so as to completely seal the heating element 100 and the sand 132 at the closed end of the aquarium heater.

The sealing element includes a plurality of circumferential outwardly extending fins 140 which extend angularly in one direction only. In this way, the fins bend backwards as the sealing element is being pushed into position and facilitate the movement of the sealing element in the direction towards the closed end of the sheath 10. Once the sealing element is in position, the sealing element is essentially locked in position since the fins 140 resist movement of the sealing element towards the open end 14 of the sheath 10. As shown in FIG. 3(b), one end of the sealing element 134 may include a plurality of recesses 142 which extend into the body of the sealing element 134 to increase the flexibility of the sealing element during insertion of the sealing element into the sheath 10.

Once the sealing element has been disposed in the proper position to lock and seal the heater 100 and sand 132 in position, the wires 30 and 32 are then twisted and pushed into position adjacent the sealing element 134. During the insertion of the thermostat 26, the cap 24 is disposed over the open end 14 of the sheath 10 and may be cemented in position so as to ensure the aquarium heater being watertight and to prevent unwarranted tampering with the inner construction of the aquarium heater.

It can be seen, therefore, that the present invention provides for an improved aquarium heater which has improvements in construction so as to facilitate the manufacture of the aquarium heater and to provide for improved performance of the aquarium heater. The improved construction of the aquarium heater of the present invention includes split ring spacers which space the heating element within the outer sheath of the aquarium heater and also provide for means for retaining the ends of the wire helix which forms the heating element. In addition, the invention includes the use of a resilient sealing element having longitudinal grooves to receive insulating wires and circumferentially extending fins to provide for movement of the sealing element in one direction and to resist movement of the sealing element in the other direction.

Although the invention has been described with reference to a particular embodiment, it is to be appreciated that various adaptations and modifications may be made and the invention is only to be limited by the appended claims.

I claim:

1. An aquarium heater, including
an elongated electrical heater element including an insulating member made from an insulating material and a wire heater wound on the insulating member from one end of the insulating member to the other end of the insulating member,
an outer sheath of insulating material, the outer sheath enveloping the heater element and sealed at both ends,
a pair of electrically insulating spacer members disposed individually one at each end of the insulating member of the heater element for spacing the heater element from the inner surface of the outer sheath and including means retaining the ends of the wire heater in fixed positions at each end of the insulating member, each of the spacer members being formed as a split ring end each having a notched portion adjacent the split to receive one end of the wire heater in wrapped relationship and to retain such end in position and each of the split rings having a plurality of protuberances extending outwardly to the inner surface of the outer sheath, at least one of the protuberances being disposed adjacent the notched portion and the split for further retaining such end of the wire heater in position, and
means for supplying electrical energy to the wire heater.

2. The aquarium heater of claim 1 wherein the wire heater is formed as a helix wrapped around the insulating member and the space between the insulating member and the outer sheath is filled with particles of an insulating material.

3. The aquarium heater of claim 2 wherein the outer sheath and the insulating member are both cylindrical in form.

4. The aquarium heater of claim 1 wherein the outer sheath is closed at one end and the heater element is positioned at the closed end and wherein a resilient electrically insulating sealing element is disposed within the outer sheath for sealing the heater element within the closed end and the sealing element includes outwardly extending fins made from a resilient material to seal against the inner surface of the outer sheath in adjustable positioning within the outer sheath and the sealing element includes grooves constructed to provide a passage of wires supplying electrical current to the wire heater and to provide a support for such wires.

5. The aquarium heater of claim 4 wherein the outwardly extending fins extend angularly in the direction away from the closed end of the outer sheath to provide for an adjustable positioning of the heating element in the direction toward the heater element.

6. The aquarium heater of claim 1 wherein the means for supplying electrical energy to the wire heater includes a thermostat for regulating the heat produced by the aquarium heater.

7. An aquarium heater, including
an outer sheath made from an insulating material and having a closed end and an open end and including means for sealing the open end,
an elongated electrical heater element disposed within the closed end of the outer sheath and spaced from the inner surface of the outer sheath,
means disposed within the outer sheath in spaced relationship to the outer sheath and having insulating properties and supporting the heater element,
spacer means disposed between the outer sheath and the insulating support means for maintaining the insulating support means in spaced relationship to the outer sheath,
means including a pair of insulated electrical wires for supplying electrical energy to the heater element, and
a resilient sealing element adjustably disposed within the outer sheath for sealing the heater element within the closed end and including outwardly extending fins made from a resilient material to seal against the inner surface of the outer sheath in adjustable positioning within the sheath and including grooves disposed in the outer surface of the sealing element and extending through the outwardly extending fins for passing the pair of insulated electrical wires supplying electrical current to the heating element and for supporting such wires.

8. The aquarium heater of claim 7 wherein particles of insulating material fill the space between the support means and the outer sheath and between the closed end of the outer sheath and the sealing element.

9. The aquarium heater of claim 7, including, electrically insulating spacer members located at the ends of the supporting means for maintaining the support means in spaced relationship to the inner surface of the outer sheath and including means for retaining the ends of the heater element in fixed position.

10. The aquarium heater of claim 9 wherein the spacer members are formed as split rings having spaced protuberances to provide the spacing between the support means and the outer sheath and having notches adjacent the splits to retain the ends of the wire member in wrapped relationship around the rings.

11. The aquarium heater of claim 7 wherein the means supplying electrical energy includes a thermostat disposed within the open end and the sealing element is intermediate the heating element and the thermostat and a cap closes and seals the open end of the outer sheath and particles of insulating material fill the space between the support means and the outer sheath and between the closed end of the outer sheath and the sealing element.

* * * * *